United States Patent
Scholand et al.

(10) Patent No.: US 8,532,691 B2
(45) Date of Patent: Sep. 10, 2013

(54) METHOD AND DEVICE FOR CONTROLLING A TRANSMIT POWER IN A RADIO COMMUNICATIONS SYSTEM

(75) Inventors: Tobias Scholand, Muelheim (DE); Juergen Kreuchauf, San Francisco, CA (US); Bernd Schiele, Duesseldorf (DE); Tilman Giese, Munich (DE); Alberto Perez, San Jose, CA (US); Rajarajan Balraj, Duesseldorf (DE)

(73) Assignee: Intel Mobile Communications GmbH, Neubiberg (DE)

( * ) Notice: Subject to any disclaimer, the term of this patent is extended or adjusted under 35 U.S.C. 154(b) by 224 days.

(21) Appl. No.: 13/197,210

(22) Filed: Aug. 3, 2011

(65) Prior Publication Data

US 2013/0035131 A1 Feb. 7, 2013

(51) Int. Cl.
*H04B 7/00* (2006.01)

(52) U.S. Cl.
USPC ................................ 455/522; 455/68; 455/69

(58) Field of Classification Search
USPC ............... 455/522, 67.11, 68–70, 115.3, 126, 455/127.1, 127.2, 135, 226.3, 277.2, 296; 370/318
See application file for complete search history.

(56) References Cited

U.S. PATENT DOCUMENTS

| | | | | |
|---|---|---|---|---|
| 5,896,411 | A * | 4/1999 | Ali et al. | 375/130 |
| 6,728,226 | B1 * | 4/2004 | Naito | 370/328 |
| 6,801,759 | B1 * | 10/2004 | Saifuddin | 455/127.1 |
| 6,917,599 | B2 * | 7/2005 | Kono | 370/320 |
| 7,133,689 | B2 * | 11/2006 | Koo et al. | 455/522 |
| 7,242,954 | B2 * | 7/2007 | Lehtinen et al. | 455/522 |
| 7,734,309 | B2 * | 6/2010 | Chi et al. | 455/522 |
| 8,072,917 | B2 * | 12/2011 | Wu et al. | 370/318 |
| 2005/0054362 | A1 * | 3/2005 | Panpaliya et al. | 455/522 |
| 2010/0189001 | A1 * | 7/2010 | Aoki et al. | 370/252 |
| 2010/0234061 | A1 * | 9/2010 | Khandekar et al. | 455/522 |
| 2011/0223950 | A1 * | 9/2011 | Shibuya | 455/501 |

* cited by examiner

*Primary Examiner* — Dominic E Rego
(74) *Attorney, Agent, or Firm* — Eschweller & Associates, LLC (57) ABSTRACT

A method for controlling a transmit power in a radio communications system includes receiving a request to increase a transmit power of an uplink channel and determining whether the transmit power was at a maximum upon receipt of a previous request to increase the transmit power preceding the received request. If the transmit power was not at the maximum upon receipt of the previous request, the transmit power is increased by a first step size and if the transmit power was at the maximum upon receipt of the previous request, the transmit power is increased by a second step size greater than the first step size.

21 Claims, 6 Drawing Sheets

METHOD AND DEVICE FOR CONTROLLING A TRANSMIT POWER IN A RADIO COMMUNICATIONS SYSTEM

FIELD

The invention generally relates to mobile communications. In particular, the invention relates to a method and a device for controlling a transmit (TX) power in a radio communications system.

BACKGROUND

During a communication between components of a radio communications system, TX powers of transmission channels may vary. Such variations may result in a degradation of a radio link quality and/or a drop of a connection between components of the radio communications system.

Mobile communications transceivers, components included therein and methods performed by such components constantly have to be improved. In particular, it is desirable to improve the stability of channels used for a data transmission between components of a radio communications system.

BRIEF DESCRIPTION OF THE DRAWINGS

The accompanying drawings are included to provide a further understanding of embodiments and are incorporated in and constitute a part of this description. The drawings illustrate embodiments and together with the description serve to explain principles of embodiments. Other embodiments and many of the intended advantages of embodiments will be readily appreciated as they become better understood by reference to the following detailed description.

DETAILED DESCRIPTION

In the following, embodiments are described with reference to the drawings wherein like reference numerals are generally utilized to refer to like elements throughout. In the following description, for purposes of explanation, numerous specific details are set forth in order to provide a thorough understanding of one or more aspects of embodiments. However, it may be evident to a person skilled in the art that one or more aspects of the embodiments may be practiced with a lesser degree of these specific details. The following description is therefore not to be taken in a limiting sense, and the scope of protection is defined by the appended claims.

The various aspects summarized may be embodied in various forms. The following description shows by way of illustration various combinations and configurations in which the aspects may be practiced. It is understood that the described aspects and/or embodiments are merely examples and that other aspects and/or embodiments may be utilized and structural and functional modifications may be made without departing from the scope of the present disclosure. In addition, while a particular feature or aspect of an embodiment may be disclosed with respect to only one of several implementations, such feature or aspect may be combined with one or more other features or aspects of the other implementations as it may be desired and advantageous for any given or particular application. Further, to the extent that the terms "include", "have", "with" or other variants thereof are used in either the detailed description or the claims, such terms are intended to be inclusive in a manner similar to the term "comprise". Also, the term "exemplary" is merely meant as an example, rather than the best or optimal.

The methods and devices described herein may be used for various wireless communication networks such as Code Division Multiple Access (CDMA), Time Division Multiple Access (TDMA), Frequency Division Multiple Access (FDMA), Orthogonal FDMA (OFDMA) and Single Carrier FDMA (SC-FDMA) networks. The terms "network", "system" and "radio communications system" are often used synonymously. A CDMA network may implement a radio technology such as Universal Terrestrial Radio Access (UTRA), cdma2000, etc. UTRA includes Wideband-CDMA (W-CDMA) and other CDMA variants. cdma2000 covers IS-2000, IS-95 and IS-856 standards. A TDMA network may implement a radio technology such as Global System for Mobile Communications (GSM) and derivatives thereof such as, e.g., Enhanced Data Rate for GSM Evolution (EDGE), Enhanced General Packet Radio Service (EGPRS), etc. An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS).

In one particular embodiment, the methods and devices described herein may be based on High Speed Downlink Packet Access (HSDPA) which has been introduced into the Release 5 (Rel-5) version of UMTS standards based on W-CDMA multiple access schemes by the "3rd Generation Partnership Project" (3GPP) standardization. HSDPA represents an enhanced 3G mobile radio communications protocol in the High Speed Packet Access (HSPA) family. HSDPA allows networks based on UMTS to provide higher data transfer speeds and capacity. Current HSDPA deployments may support down-link speeds of 1.8, 3.6, 7.2 and 14.0 Mbit/s. Further speed increases may be available with HSDPA+ which may provide speeds of up to 42 Mbit/s and 84 Mbit/s with Release 9 of the 3GPP standards.

The above mentioned 3GPP standards are described in various documents provided by the 3GPP organization. In particular, the contents of the documents 3GPP TS 25.101; User Equipment (UE) radio transmission and reception (FDD) and 3GPP TS 25.214; Physical layer procedures (FDD) and 3GPP TS 34.121-1; User Equipment (UE) conformance specification; Radio transmission and reception (FDD); Part 1: Conformance specification and 3GPP TS 34.121-2; User Equipment (UE) conformance specification;

Radio transmission and reception (FDD); Part 2: Implementation Conformance Statement (ICS) are included herein by reference.

In radio communications systems, a transmitter transmitting one or more radio communications signals via one or more radio communications channels may be present. The transmitter may be a base station or a transmitting device included in a user's device, such as a mobile radio transceiver, a handheld radio device or any similar device. In particular, a transmitter may include a device as described herein. According to the UMTS standard, a transmitter or base station may also be referred to as "Node B". Radio communications signals transmitted by transmitters may be received by receivers such as a receiving device in a mobile radio transceiver, a handheld radio device or any similar device. In particular, radio communications systems as described herein may include UMTS systems which may conform to the 3GPP standard for UMTS systems. According to the UMTS standard, a receiver or mobile station may also be referred to as "User Equipment" (UE). Radio communications signals as described herein may be provided in UMTS systems, in particular over radio communications physical channels, such as primary common pilot channels, secondary common pilot channels, dedicated physical channels, dedicated physical control channels or similar channels according to the UMTS standard.

Figure 1:
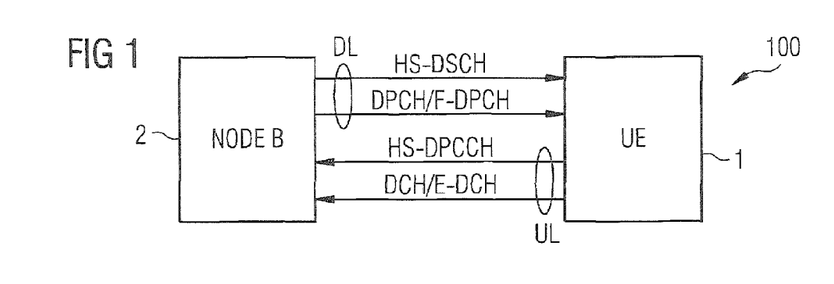
FIG. 1 schematically illustrates a radio communications system 100.

FIG. 1 schematically illustrates a radio communications system 100 including a UE 1 and a Node B 2. It is understood that the radio communications system 100 may include further components that are not explicitly illustrated for the sake of simplicity. For example, the radio communications system 100 may further include a Radio Network Controller (RNC) and a Core Network (CN). The RNC may be configured to provide various control functionalities for the Node B 2 while the CN may be configured to provide various services to the UE 1.

A communication between the UE 1 and the Node B 2 is indicated by arrows. In a downlink (DL) direction, data may be transmitted from the Node B 2 to the UE 1 via a High Speed Downlink Shared Channel (HS-DSCH), a Dedicated Physical Channel (DPCH) or a Fractional Dedicated Physical Channel (F-DPCH). In an uplink (UL) direction, data may be transmitted from the UE 1 to the Node B 2 via an HS-DPCCH (High Speed Dedicated Physical Control Channel), a Dedicated Channel (DCH) and an Enhanced Dedicated Channel (E-DCH). The DCH may include a Dedicated Physical Control Channel (DPCCH) and (optionally) a Dedicated Physical Data Channel (DPDCH) while the E-DCH may include an Enhanced Dedicated Physical Control Channel (E-DPCCH) and an Enhanced Dedicated Physical Data Channel (E-DPDCH). Note that the mentioned uplink and downlink channels are, inter alia, known from the above-mentioned 3GPP standards. It is understood that data may also be transmitted between the UE 1 and the Node B 2 via further transmission channels.

The radio communications system 100 may be based on HSDPA in which an increase of the maximum transmission rate in a downlink direction may be achieved by introducing "link adaptive" higher order modulation (e.g. Quadrature Phase Shift Keying (QPSK), 16 Quadrature Amplitude Modulation (QAM), etc.) and multi-code transmission in combination with hybrid automatic request (H-ARQ) procedures. H-ARQ relates to an error-control method for transmitting data in which acknowledgment information is used to provide a reliable data transmission. The acknowledgment information includes messages sent by a receiver to a transmitter indicating whether data has been correctly received (ACK) or not (NACK). For example, the acknowledgment information of the H-ARQ protocol may be fed back from the UE 1 to the Node B 2.

In "link adaptation", modulation and coding parameters as well as further signal and protocol parameters are dynamically adapted to conditions of an associated radio link which may depend on path loss, interference effects, etc. In HSDPA, such parameters may be adapted every 2 milliseconds. In particular, link adaptation may be enabled by a continuous measurement of the channel quality at the UE 1 and feeding back a corresponding Channel Quality Indicator (CQI) from the UE 1 to the Node B 2. The CQI may include channel quality information, for example a carrier level received signal strength indicator (RSSI) and/or a bit error rate (BER).

The CQI and acknowledgment information may be transmitted via the HS-DPPCH. Similar to a transmission time interval (TTI) of the HS-DSCH, a TTI of the HS-DPCCH has a length of three time slots, i.e. a length of 2 milliseconds. The first time slot may be used for transmitting the acknowledgment information while the second and third time slot may be used for transmitting the CQI. The CQI feedback cycle, i.e. the cycle time for the transmission of the TT's including the CQI, may be adjusted by the CN. The acknowledgment information is transmitted for each transport block that has been received by the UE 1 via the HS-DPCH. If no CQI or acknowledgment information needs to be transmitted for a particular TTI, the HS-DPCCH may be muted and thus may be inactive during corresponding time slots. Note that while all channels in the DCH and E-DCH are time slot aligned, the HS-DPCCH is aligned to the HS-DSCH timing which results in a timing offset compared to the DCH and the E-DCH.

During a communication between the UE 1 and the Node B 2, TX powers of uplink channels may be adjusted. In order to change the TX power of the DPCCH (and thus the total TX power), a TX power control (TPC) information may be transmitted from the Node B 2 to the UE 1 via the DPCH or the F-DPCH. Such a power control scheme may be referred to as "inner loop power control" (ILPC). The TPC information may include or consist of one single bit per time slot wherein a bit value of "1" (TPC=up) may correspond to a request to increase the TX power of the DPCCH while a bit value of "0" (TPC=down) may correspond to a request to decrease of the TX power of the DPCCH.

The total TX power of the UE 1 in the uplink direction may correspond to a sum of the TX powers of all used uplink physical channels, for example the HS-DPCCH, DCH and E-DCH (see FIG. 1). The TX power configuration of the HS-DPCCH and all uplink physical channels included in the DCH and the E-DCH may be derived from settings of the CN. A change of the total TX power may thus be effected by using the above-mentioned TPC information and/or by changing the physical uplink channel configuration. In this connection, it is noted that the power levels of the DCH and E-DCH physical channels can usually only change at the time slot boundaries of an associated DCH time slot while the power level of the HS-DPPCH may change at the time slot boundaries of a DCH time slot and boundaries of an HS-DPCCH time slot.

During a communication between the UE 1 and the Node B 2, the quality of the uplink data transmission may depend on the availability of sufficient total TX power. In certain scenarios, the quality of the uplink data transmission may degrade which may even result in a call drop. For example, an attenuation of the uplink channels increases for the case of the UE 1 being located at the edge of a cell. In order to address this degradation of the uplink quality, the total TX power for the uplink needs to be increased. However, according to the 3GPP standard, a maximum TX power for the uplink is defined that cannot be exceeded by the total TX power. Hence, if the total TX power has reached the maximum TX power level, it is not possible for the ILPC to compensate for the varying channel attenuation to maintain a constant uplink quality. For a handset UE 1, the maximum TX power may particularly equal a value of 24 dBm in one standard.

In the mentioned scenario, the uplink quality may be further degraded if a data transmission via the HS-DPCCH is performed. Such a data transmission requires energy for involved radio frequency components of the UE 1 and thus a part of the total TX power. The TX power of the DCH and the E-DCH may then be further reduced resulting in a further degradation of the uplink quality. If the total TX power falls below the maximum TX power again, the ILPC may be used to increase the value of the TX power of the DPCCH and thus the total TX power. In the following, the described scenario is further explained in connection with TX powers of uplink channels.

Figure 2:
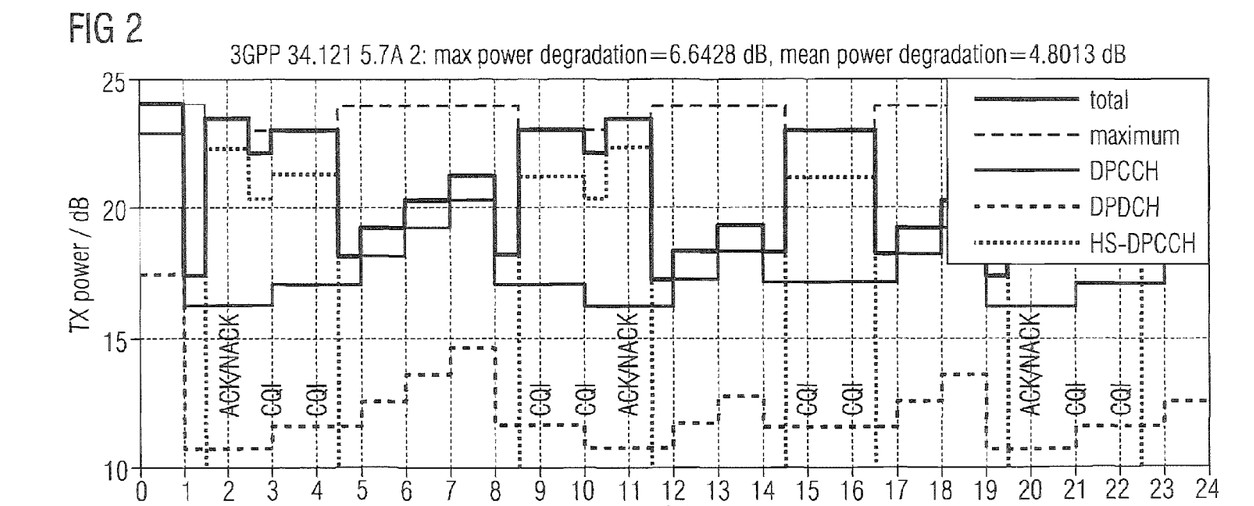
FIG. 2 schematically illustrates TX powers of various uplink channels.

FIG. 2 schematically illustrates TX powers of various uplink channels wherein the TX powers in units of dB are plotted against time in units of time slots. In the following, a point "x" in time may be referred to as "x ts", the abbreviation "ts" denoting "time slot". For example, the end of the first slot may be referred to as "1 ts". Further, a time interval from a point in time "x" to a point in time "y" may be referred to as [x, y]. For example, the second time slot of FIG. 2 may be referred to as [1, 2].

FIG. 2 shows the total TX power, the maximum TX power as well as the TX powers of the DPCCH, DPDCH and HS-DPCCH. The total TX power may be defined to equal the sum of the TX powers of the DPCCH, DPDCH, HS-DPCCH. Note that the scaling of the TX powers is logarithmic due to the used units of dB. Note further that the timing of the HS-DPCCH is shifted by one half of a time slot compared to the timing of the DPCCH and the DPCCH. The CQI feedback cycle, i.e. the cycle time for the transmission of the TTIs including the CQI and the acknowledgment information, equals six time slots or 4 milliseconds. Every third TTI of the HS-DPCCH transmission does not include acknowledgment information. Hence, each of the first TTI [1.5, 4.5] and the second TTI [8.5, 11.5] has an HS-DPCCH activity of three time slots while the third TTI [14.5, 16.5] has two time slots HS-DPCCH activity. As can be seen from FIG. 2, the difference between the TX power of the DPDCH and the TX power of the DPCCH is constant over the whole time interval [0, 24]. In contrast to this, the difference between the TX powers of the HS-DPCCH and the DPCCH changes for the TTIs in which the CQI and acknowledgment information is transmitted.

Referring back to the above-mentioned scenario of the UE 1 being located at an edge of a cell, the UE 1 constantly (i.e. throughout the time interval [0, 24]) receives requests corresponding to or including TPC information requesting an increase of the TX power of the DPCCH in order to compensate for channel attenuation caused by the position of the UE 1. In FIG. 2, the total TX power equals the maximum TX power during the time interval [0, 1] such that it is not possible to further increase the TX power of the DPCCH. A state in which the UE 1 receives a request to increase the TX power of the DPCCH (i.e. TPC=up) and such an increase is not possible may be referred to as "saturated state". It is understood that the terms "saturated state of the total TX power" and "saturated state of the DPCCH power" refer to similar states. For example, a state in which the total TX power has reached the maximum TX power may correspond to a saturated state. In contrast to this, a state in which the UE 1 receives a request to increase the TX power of the DPCCH and such an increase is possible may be referred to as "non-saturated state".

At the time 1.5 ts a transmission of the CQI and acknowledgment information via the HS-DPCCH is started, the transmission requiring a certain amount of the total TX power. Since exceeding the maximum TX power is not possible, the total TX power and the TX power of the DPCCH are decreased at time 1 ts. In FIG. 2, the drop or decrease of the total TX power equals the maximum power degradation and has a value of 6.6428 dB. The mean power degradation, which may be defined as the mean difference of the degraded DPCCH power to the maximum DPCCH power without HS-DPCCH activity, has a value of 4.8013 dB. Note that the illustrated degradation of the DPCCH TX power may also be caused by further incidents, for example a transport format change (TFC) of the DCH and/or E-DCH.

The decrease of the total TX power at the time 1 ts may have an effect on the communication between the UE 1 and the Node B 2, in particular for the case of an "HSDPA call". A "non HSDPA call" corresponds to a circuit switched voice call in which an employed Radio Access Bearer (RAB) is mapped to the DCH for the uplink and the downlink direction. An "HSDPA call" corresponds to a multi radio access bearer call wherein the radio access bearer for the packet switched data call is mapped to the HS-DSCH while the radio access bearer for the circuit switched voice call is mapped to the DCH in the uplink and the downlink direction. The transmission of the CQI via the HS-DPCCH starting at the time 1.5 ts may lead to a degradation of the TX power of other uplink channels, for example the DPCCH, and may thus even result in a drop of the voice call.

In the time interval [1.5, 4.5], the CQI and the acknowledgment information is transmitted over the HS-DPCCH. Note that, for example due to the location of the UE 1 at the cell edge, during the time interval [1.5, 4.5] the UE 1 receives a request to increase the TX power of the DPCCH at every time slot. Except for a time interval [2.5, 3], the total TX power equals the maximum TX power throughout the HS-DPCCH activity. That is, almost throughout the whole time interval [1.5, 4.5], the total TX power and the TX power of the DPCCH are in a saturated state. Except during the time interval time interval [2.5, 3] a non-saturated state is present such that it is possible to increase the TX power of the DPCCH at the time 3 ts.

At the time 4.5 ts, the transmission of the CQI and the acknowledgment information is finished. Since the HS-DPCCH is muted, it does not require further power. At the time 4.5 ts, the total TX power switches from a saturated state to a non-saturated state such that it becomes possible to increase the TX power of the DPCCH and thus the total TX power. In a time interval [4.5, 8], the TX power of the DPCCH and the total TX power is increased for each time slot by a predetermined step size. For example, the "common power control algorithm" of the 3GPP standard may be employed such that the step size may have a value of 1 dBm. Note that, since the step size corresponds to a predetermined constant value, the increase of the total TX power between two time slots is based on the TX power of the DPCCH of the foregoing slot. At the time 8.5 ts a further transmission via the HS-DPPCH is started such that the total TX power is degraded again at the time 8 ts. The characteristics of the illustrated TX powers for times greater than 8.5 ts are similar to the previously described.

Figure 3:
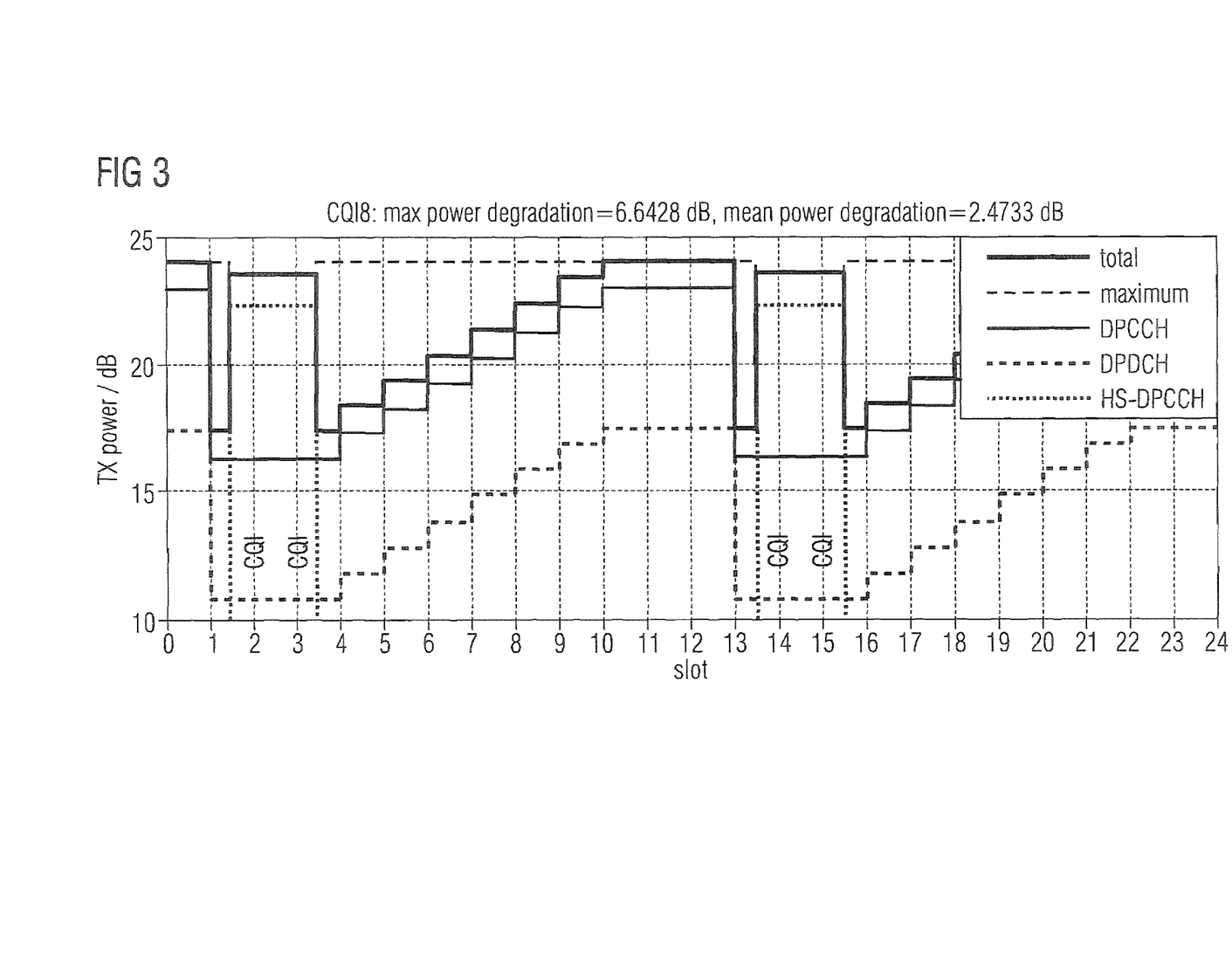
FIG. 3 schematically illustrates TX powers of various uplink channels.

FIG. 3 schematically illustrates TX powers of various uplink channels wherein the TX powers in units of dB are plotted against time in units of time slots. Similar to FIG. 2, the TX powers of FIG. 3 may be read in connection with a UE located at an edge of a cell. Comments made in connection with FIG. 2 may also hold true for FIG. 3. In contrast to FIG. 2, no acknowledgment information is transmitted via the HS-DPCCH. At the time 1 ts, the total TX power is degraded such that a transmission of the CQI starting at the time 1.5 ts becomes possible. Throughout the time interval [1.5, 3.5], the total TX power is in a saturated state such that it is not possible to increase the TX power of the DPCCH.

At the time 3.5 ts, the total TX power changes from a saturated state to a non-saturated state such that it becomes possible to increase the TX power of the DPCCH. Since there is no HS-DPCCH activity during the time interval [3.5, 13.5], the total TX power may be increased to the maximum value of the TX power during the time interval [4, 10]. Note that, since the increase of the total TX power requires various time slots, the link quality may be degraded during the time interval [4, 10] such that the probability of a call drop may be increased. At the time 10 ts, the total TX power switches from a non-saturated state to a saturated state such that it becomes impossible to further increase the TX power of the DPCCH during the time interval [10, 13]. Note that if the saturated state is reached at time 10 ts the ILPC may be broken. Similar to FIG. 2, the total TX power drop and the mean power degradation of FIG. 3 equal a value of 6.6428 dB and 2.4733 dB, respectively.

Figure 4:
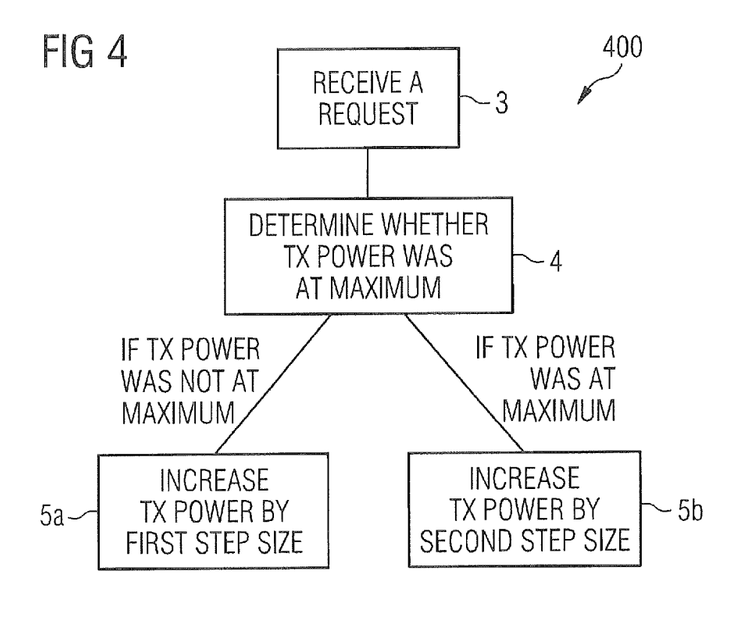
FIG. 4 schematically illustrates a method 400 as an exemplary embodiment.

FIG. 4 schematically illustrates a method 400 for controlling a TX power in a radio communications system. In a first method step 3, a request to increase a TX power of an uplink channel is received. In a second method step 4, it is determined whether the TX power is at its maximum upon receipt of a previous request to increase the TX power preceding the present request at 3. If the TX power was not at the maximum upon receipt of the previous request, the TX power is increased by a first step size in a third method step 5a. If the TX power was at the maximum upon receipt of the previous request, the TX power is increased by a second step size greater than the first step size in a fourth method step 5b. Note that FIG. 4 does not necessarily imply that method steps 3 and 4 are performed in a specific chronological order. For example, it is also possible that method step 3 is performed after method step 4 or at least parts of both method steps 3 and 4 are performed at the same time.

Figure 5:
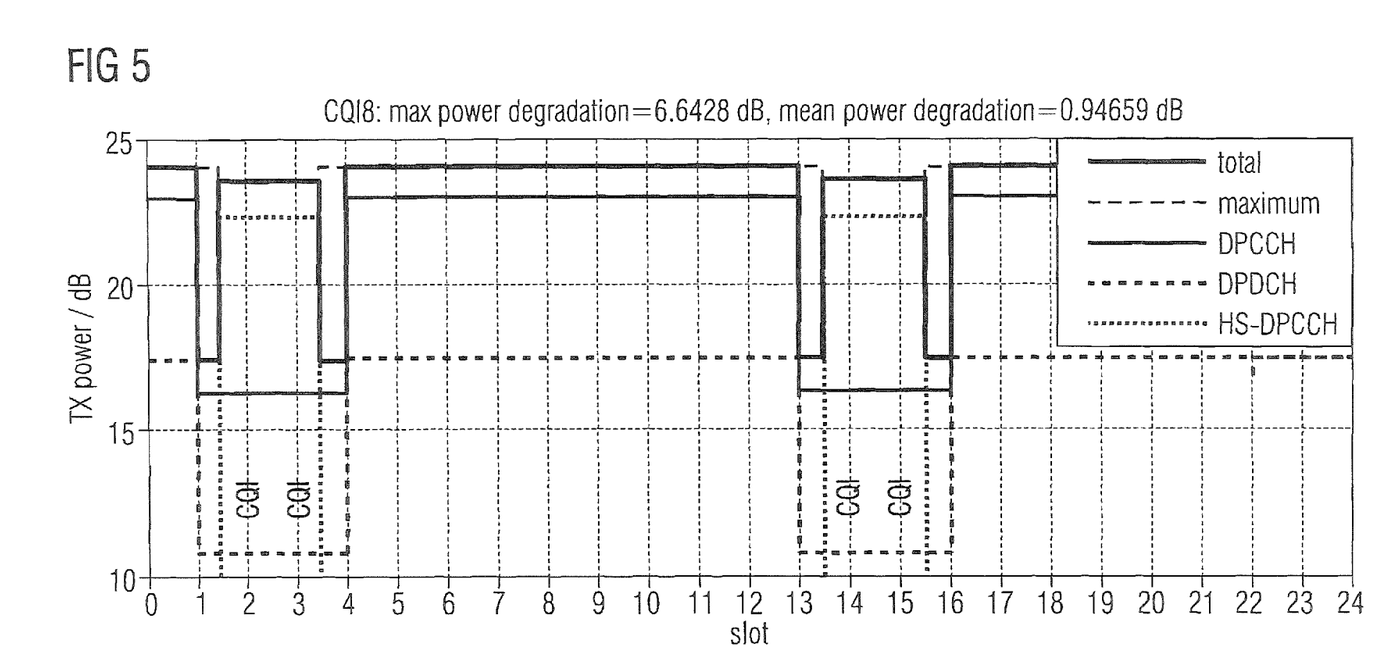
FIG. 5 schematically illustrates TX powers of various uplink channels.

In the following, method 400 is referred to in connection with FIG. 5. FIG. 5 schematically illustrates TX powers of various uplink channels wherein the TX powers in units of dB are plotted against time in units of time slots. Again, for example due to a location of the UE 1 at the edge of a cell, a request to increase the TX power of the DPCCH is received for each time slot throughout the illustrated time interval [0, 24]. Comments made in connection with FIGS. 2 and 3 may also hold true for FIG. 5. During a time interval [0, 1] the total TX power equals the maximum TX power. At the time 1 ts, the total TX power is degraded and the CQI is transmitted via the HS-DPCCH during a time interval [1.5, 3.5]. At the time 3.5 ts, the transmission of the CQI information is finished and no further TX power for the HS-DPCCH is required such that the total TX power is decreased. The total TX power thus changes from a saturated state to a non-saturated state and it becomes possible to increase the TX power of the DPCCH. At the time 4 ts, the total TX power is increased to the maximum TX power such that the total TX power is in a saturated stated again. During the time interval [4, 13], the total TX power equals the maximum TX power and thus remains in a saturated state.

According to method step 3, a request to increase a TX power of an uplink channel is received at a first point in time. Referring to FIG. 5, this request may be identified with a TPC information received by the UE 1 during the time slot [3, 4]. In method step 4, it is determined whether the TX power was at maximum upon receipt of a previous request to increase the transmit power preceding the request. In other words, it is determined whether the total TX power has been in a saturated state or in a non-saturated state before receiving the request. Referring to FIG. 5, it may thus be determined whether the total TX power was at maximum and thus in a saturated state at receipt of TPC information before the time 4 ts or before the time slot [3, 4]. In particular, it may be determined whether the total TX power was at maximum at the time 3 ts or during the time slot [2, 3].

If the total TX power has been in a non-saturated state (see method step 5a), the total TX power was not at maximum upon receipt of the previous request. Such a situation may occur if the UE 1 is located close to the Node B 2 such that no high values for the total TX power are required. It may thus not be necessary that the total TX power is increased to the maximum TX power such that a non-saturated state is present. In particular, there may be no necessity for the total TX power to recover in a fast way. Hence, it may suffice to choose a first step size to increase the total TX power having a relatively small value, for example a value of 1 dBm.

If the TX has been in a saturated state (see method step 5b), the total TX power was at maximum upon receipt of the previous request. This applies to FIG. 5. In the time slot [3, 4] the request to increase the total TX power is received and the total TX power has been in a saturated state throughout the time interval [0, 4] and in particular in the time slot [2, 3] directly preceding the time slot [3, 4]. Since the total TX power is at a low level at the time 4 ts, it may be important to increase the total TX power in a fast way. Therefore, a second step size greater than the first step size of method step 5a is chosen. In FIG. 5, the second step size is chosen such that the total TX power instantaneously reaches the maximum TX power at the time 4 ts. Of course, the total TX power does not need to reach the maximum TX power in a step-wise manner as shown in FIG. 5, but may also be increased continuously by the second step size during a duration of smaller than two time slots, i.e. a duration of smaller than ⅔ milliseconds.

The choice of the greater second step size and thus the faster increase of the total TX power may result in a stabilization of data transmission between the UE 1 and the Node B 2. In addition, the mean power degradation and the probability of a call drop may be decreased. In contrast to this, the slower increase of the total TX power to the maximum TX power after an activity of the HS-DPCCH as illustrated in FIG. 4 requires a longer time interval [4, 10] of six time slots which may have a negative effect on the link quality.

There are various possibilities to choose a value for the second step size. For example, the TX power of the DPCCH and thus the total TX power may be increased by the second step size to the latest preceding value of the total TX power which was not at maximum. For this case and referring back to FIG. 3, the total TX power may then be increased at the time 16 ts to a value the total TX power had during the time interval [9, 10]. In another example, the second step size may equal a value of a degradation of the total TX power. For this case and referring back to FIG. 5, one of the decreases of the total TX power at the times 1 ts or 3.5 ts may be determined and the total TX power may be increased at the time 4 ts by one of these determined values. Comparing FIGS. 3 and 5, and assuming that the step size of FIG. 3 (i.e. the first step size) corresponds to a typical value of 1 dBm, the value of the second step size may particularly be chosen to have a value greater than 1 dBm.

Figure 6:
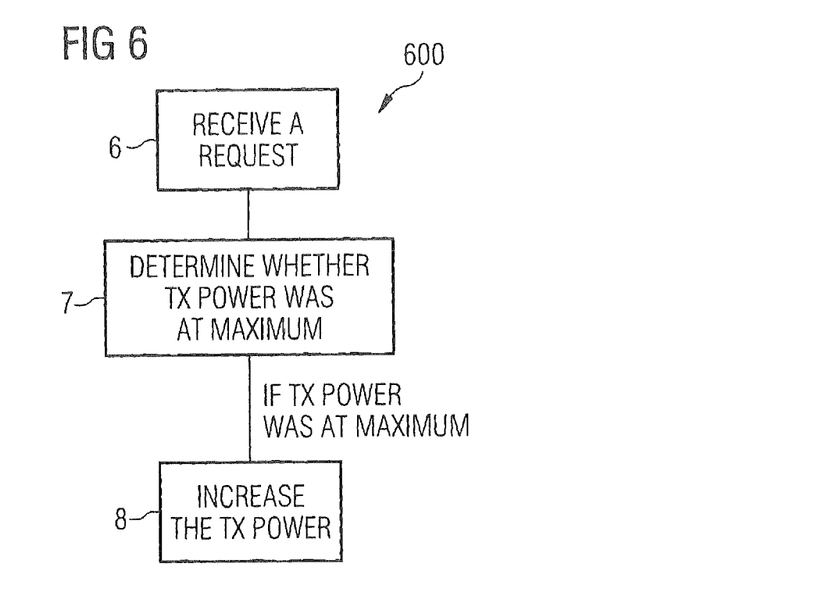
FIG. 6 schematically illustrates a method 600 as an exemplary embodiment.

FIG. 6 schematically illustrates a further method 600 for controlling a TX power in a radio communications system. In a first method step 6, a request is received to increase a TX power of an uplink channel. In a second method step 7, it is determined whether the TX power was at the maximum upon receipt of a previous request to increase the TX power preceding the present request. If the TX power was at the maximum upon receipt of the previous request, the TX power is increased in a third method step 8 during a time duration of smaller than two time slots to the latest preceding value of the TX power which was not at the maximum.

Note that FIG. 6 does not necessarily imply that method steps 6 and 7 are performed in a specific chronological order. For example, it is also possible that method step 6 is performed after method step 7 or at least parts of both method steps 6 and 7 are performed at the same time. Note further that comments made in connection with method 400 may also hold true for method 600. Applying method step 8 in a scenario similar to FIG. 3, the total TX power at the time 16 ts may be increased to a value of the total TX power that was present during the time slot [9, 10].

Figure 7:
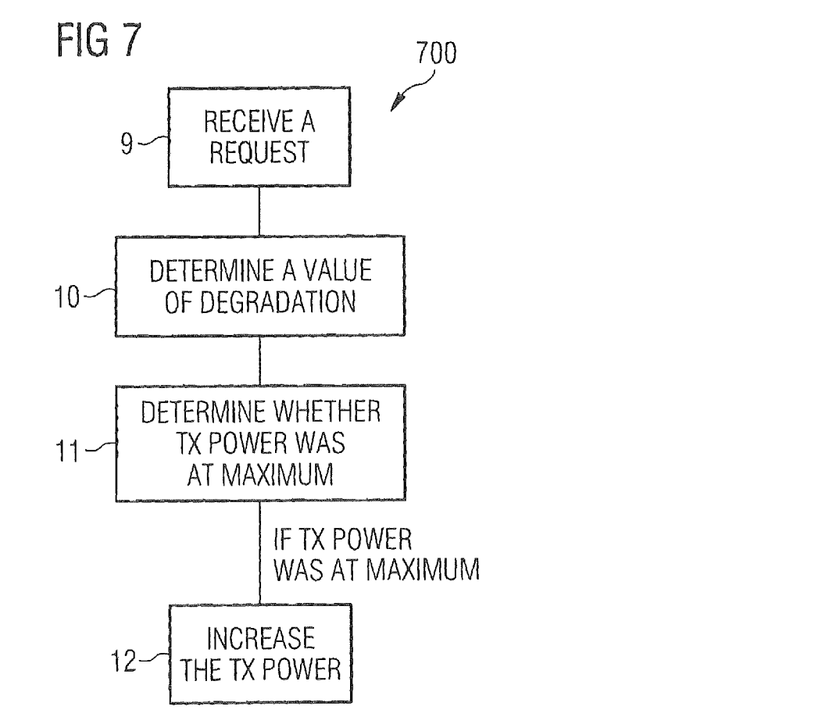
FIG. 7 schematically illustrates a method 700 as an exemplary embodiment.

FIG. 7 schematically illustrates a method 700 for controlling a TX power in a radio communications system. In a first method step 9, a request is received to increase a TX power of an uplink channel. In a second method step 10, a value of a degradation of the TX power is determined. In a third method step 11, it is determined whether the TX power was at the maximum upon receipt of a previous request to increase the TX power preceding the present request. If the TX power was at the maximum upon receipt of the previous request, the TX power is increased in a fourth method step 12 during a time duration of smaller than two time slots to the maximum of one of the value of the degradation and a predetermined minimum step size. Note that FIG. 7 does not necessarily imply that method steps 9 to 11 are performed in a specific chronological order. For example, the chronological order of method steps 9 to 11 may arbitrarily vary or at least parts of method steps 9 and 11 may be performed at the same time. Note further that comments made in connection with previously described methods may also hold true for method 700.

In the following, method 700 is referred to in connection with FIG. 5. In FIG. 5, the degradation of the total TX power at the time 1 ts may be determined. The request to increase the TX power of the DPCCH may be received in the time slot [3, 4]. Since the total TX power was at maximum TX power and thus in a saturated state during the time interval [0, 4], it was not possible to increase the total TX power upon receiving previous requests to increase the total TX power during the time interval [0, 4]. At the time 4 ts, the total TX power is then increased by a step size corresponding to the previously determined value of the total TX power drop at the time 1 ts which is greater than the predetermined minimum value of 1 dBm.

Figure 8:
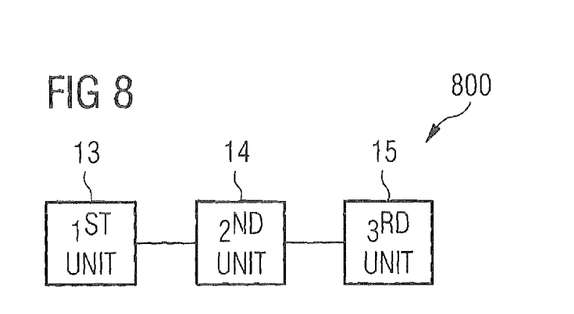
FIG. 8 schematically illustrates a device 800 as an exemplary embodiment.
Figure 9:
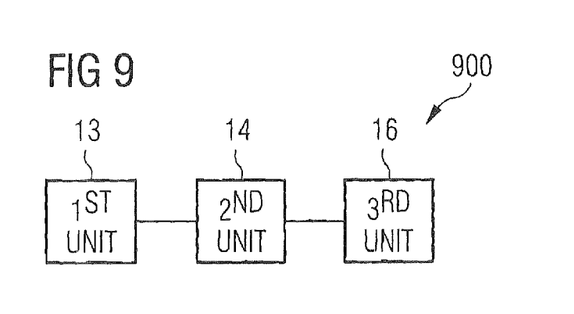
FIG. 9 schematically illustrates a device 900 as an exemplary embodiment.
Figure 10:
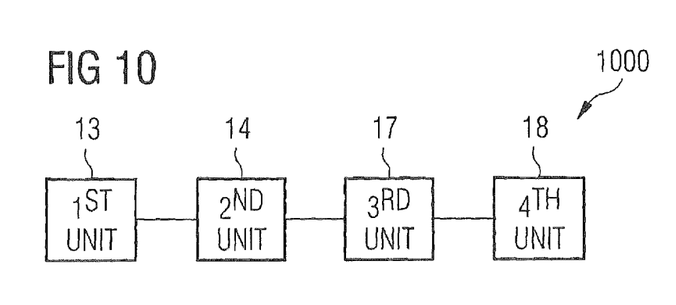
FIG. 10 schematically illustrates a device 1000 as an exemplary embodiment.

FIGS. 8, 9 and 10 illustrate devices 800, 900 and 1000, respectively, for controlling a TX power in a radio communications system. In particular, the devices 800, 900 and 1000 are configured to perform the previously described methods 400, 600 and 700, respectively. Units included in the devices 800, 900 and 1000 are not restricted to a specific implementation.

The device 800 of FIG. 8 may be read in connection with the previously described method 400 of FIG. 4 in one embodiment, but is not so limited. The device 800 includes a first unit 13 configured to receive a request to increase a TX power of an uplink channel and a second unit 15 to determine whether the TX power was at the maximum upon receipt of a previous request to increase the TX power preceding the present request. The device 800 further includes a third unit 15 configured to increase the TX power by a first step size if the TX power was not at maximum upon receipt of the previous request. In addition, the third unit 15 is configured to increase the TX power by a second step size greater than the first step size if the TX power was at maximum upon receipt of the previous request.

The device 900 of FIG. 9 may be read in connection with the previously described method 600 of FIG. 6 in one embodiment, but is not so limited. The device 900 includes a first unit 13 configured to receive a request to increase a TX power of an uplink channel and a second unit 14 configured to determine whether the TX power was at the maximum upon receipt of a previous request to increase the TX power preceding the present request. The device 900 further includes a third unit 16 configured to increase the TX power during a time duration of smaller than two time slots to the latest preceding value of the TX power which was not at the maximum if the TX power was at the maximum upon receipt of the previous request.

The device 1000 of FIG. 10 may be read in connection with the previously described method 700 of FIG. 7 in one embodiment, but is not so limited. The device 1000 includes a first unit 13 configured to receive a request to increase a TX power of an uplink channel and a second unit 14 configured to determine whether the TX power was at the maximum upon receipt of a previous request to increase the TX power preceding the present request. The device 1000 further includes a third unit 17 configured to determine a value of a degradation of the TX power and a fourth unit 18 configured to increase the TX power during a time duration of smaller than two time slots to the maximum of one of the value of the degradation and a predetermined minimum step size if the TX power was at the maximum upon receipt of the previous request.

As already stated above, the methods 400, 600 and 700 may provide a stabilization of a data transmission between the UE 1 and the Node B 2. Note that such a stabilization may also be provided by further schemes that may be combined with the methods and devices described herein. For example, the UE 1 may indicate to the NC that the total TX power has dropped by a certain threshold value. The NC may then switch off a present HSDPA data transmission. Note that the time required for the UE 1 to indicate the total TX power drop to the NC may exceed the time required for performing one of the methods 400, 600 and 700. Further, such an indication to the NC may require more TX power than available. In addition or alternatively, the NC may adapt, in particular increase, the CQI feedback cycle such that the probability for a call drop may be decreased. Note that an increase in the CQI feedback cycle may result in a degradation of an HSDPA downlink since additional latency is introduced to link adaptation, i.e. the delay between changes of radio link conditions and an adaptation of signal and protocol parameters in reaction to such changes is increased.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

What is claimed is:

1. A method for controlling a transmit power in a radio communications system, comprising:
   receiving a request to increase a transmit power of an uplink channel at a communication device;
   determining whether the transmit power was at a maximum upon receipt of a previous request to increase the transmit power preceding the received request at the communication device;
   increasing the transmit power by a first step size at the communication device if the transmit power was not at the maximum upon receipt of the previous request; and
   increasing the transmit power by a second step size greater than the first step size at the communication device if the transmit power was at the maximum upon receipt of the previous request.

2. The method of claim 1, wherein the transmit power is increased by the second step size to the latest preceding value of the transmit power which was not at the maximum.

3. The method of claim 1, further comprising:
   determining a value of a degradation of the transmit power of the uplink channel, wherein the second step size equals the degradation value.

4. The method of claim 1, wherein the uplink channel comprises a Dedicated Physical Control Channel (DPCCH).

5. The method of claim 1, wherein increasing the transmit power comprises increasing the transmit power of a Dedicated Physical Control Channel (DPCCH).

6. The method of claim 1, wherein the transmit power equals the total transmit power of the uplink channel.

7. The method of claim 1, wherein the second step size is greater than 1 dBm.

8. The method of claim 1, wherein the transmit power is increased by the second step size during a time duration of smaller than two time slots.

9. The method of claim 8, wherein each of the two time slots has a length of ⅔ milliseconds.

10. The method of claim 1, wherein each of the received request and the previous request is received via a downlink channel.

11. The method of claim 1, wherein each of the received request and the previous request comprises a transmit power control (TPC) information.

12. The method of claim 1, further comprising:
   determining a degradation of the transmit power of the uplink channel before increasing the transmit power of the uplink channel by the second step size.

13. The method of claim 1, further comprising:
   transmitting at least one of an acknowledgment information and a channel quality indicator (CQI) in an uplink direction before increasing the transmit power of the uplink channel by the second step size.

14. The method of claim 13, wherein the at least one of an acknowledgment information and a channel quality indicator (CQI) is transmitted via a High Speed Dedicated Physical Control Channel (HS-DPCCH).

15. The method of claim 1, wherein the transmit power is increased between a first uplink transmission of a first acknowledgment information and/or of a first channel quality indicator (CQI) and a second uplink transmission of a second acknowledgment information and/or of a second channel quality indicator (CQI).

16. The method of claim 15, wherein the time between the first uplink transmission and the second uplink transmission lies in a range between 7 milliseconds and 20 milliseconds.

17. The method of claim 1, further comprising:
   changing a transport format of the uplink channel before increasing the transmit power of the uplink channel by the second step size.

18. A method for controlling a transmit power in a radio communications system, comprising:
   receiving a request to increase a transmit power of an uplink channel at a communication device;
   determining whether the transmit power was at a maximum upon receipt of a previous request to increase the transmit power preceding the received request at the communication device; and
   increasing the transmit power during a time duration of smaller than two time slots to the latest preceding value of the transmit power that was not at the maximum at the communication device if the transmit power was at the maximum upon receipt of the previous request.

19. A method for controlling a transmit power in a radio communications system, comprising:
   receiving a request to increase a transmit power of an uplink channel at a communication device;
   determining a value of a degradation of the transmit power at the communication device;
   determining whether the transmit power was at a maximum upon receipt of a previous request to increase the transmit power preceding the received request at the communication device; and
   increasing the transmit power during a time duration of smaller than two time slots to the larger one of the degradation value and a predetermined minimum step size at the communication device if the transmit power was at the maximum upon receipt of the previous request.

20. A device for controlling a transmit power in a radio communications system, comprising:
   a first unit configured to receive a request to increase a transmit power of an uplink channel;
   a second unit configured to determine whether the transmit power was at a maximum upon receipt of a previous request to increase the transmit power preceding the received request; and
   a third unit configured to:
      increase the transmit power by a first step size if the transmit power was not at a maximum upon receipt of the previous request; and
      increase the transmit power by a second step size greater than the first step size if the transmit power was at the maximum upon receipt of the previous request.

21. A device for controlling a transmit power in a radio communications system, comprising:
   a first unit configured to receive a request to increase a transmit power of an uplink channel;
   a second unit configured to determine whether the transmit power was at a maximum upon receipt of a previous request to increase the transmit power preceding the received request; and
   a third unit configured to increase the transmit power during a time duration of smaller than two time slots to a latest preceding value of the transmit power that was not at the maximum if the transmit power was at the maximum upon receipt of the previous request.

* * * * *